(12) United States Patent
Jain et al.

(10) Patent No.: US 10,719,464 B1
(45) Date of Patent: Jul. 21, 2020

(54) LOCK CIRCUIT FOR COMPETING KERNELS IN A HARDWARE ACCELERATOR

(71) Applicant: Xilinx, Inc., San Jose, CA (US)

(72) Inventors: Sunita Jain, Bangalore (IN); Sweatha Rao, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/401,104

(22) Filed: May 1, 2019

(51) Int. Cl.
*G06F 13/362* (2006.01)
(52) U.S. Cl.
CPC .................... *G06F 13/362* (2013.01)
(58) Field of Classification Search
CPC ...................................... G06F 13/362
See application file for complete search history.

(56) References Cited

U.S. PATENT DOCUMENTS

| | | | | |
|---|---|---|---|---|
| 5,845,147 | A * | 12/1998 | Vishlitzky | G06F 9/52 710/5 |
| 6,480,918 | B1 * | 11/2002 | McKenney | G06F 9/526 710/200 |
| 7,274,706 | B1 * | 9/2007 | Nguyen | H04L 12/56 370/419 |
| 9,817,703 | B1 * | 11/2017 | Ryland | G06F 9/52 |
| 2005/0100017 | A1 * | 5/2005 | Williams, Jr. | G06F 9/526 370/394 |
| 2007/0261053 | A1 * | 11/2007 | Avkarogullari | G06F 9/526 718/100 |
| 2010/0250809 | A1 * | 9/2010 | Ramesh | G06F 9/526 710/200 |

FOREIGN PATENT DOCUMENTS

EP 2515294 A2 10/2012

OTHER PUBLICATIONS

U.S. Appl. No. 15/967,473, filed Apr. 30, 2018, Entitled: "Circuit for and Method of Providing a Programmable Connector of an Integrated Circuit Device", San Jose, CA USA.
U.S. Appl. No. 16/024,500, filed Jun. 29, 2018, Entitled: "Transparent Port Aggregation in Multi-Chip Transport Protocols", San Jose, CA USA.
U.S. Appl. No. 16/053,384, filed Aug. 2, 2018, Entitled: "Logical Transport Over a Fixed PCIE Physical Transport Network", San Jose, CA USA.
U.S. Appl. No. 16/053,488, filed Aug. 2, 2018, Entitled: "Hybrid Precise and Imprecise Cache Snoop Filtering", San Jose, CA USA.

(Continued)

*Primary Examiner* — Farley Abad
(74) *Attorney, Agent, or Firm* — Patterson + Sheridan, LLP (57) ABSTRACT

An example hardware accelerator in a computing system includes a bus interface coupled to a peripheral bus of the computing system; a lock circuit coupled to the bus interface; and a plurality of kernel circuits coupled to the lock circuit and the bus interface; wherein the plurality of kernel circuits provide lock requests to the lock circuit, the lock requests for data stored in system memory of the computing system; wherein the lock circuit is configured to process the lock requests from the plurality of kernel circuits and to issue atomic transactions over the peripheral bus through the bus interface based on the lock requests.

20 Claims, 9 Drawing Sheets

(56) References Cited

OTHER PUBLICATIONS

U.S. Appl. No. 16/208,260, filed Dec. 3, 2018, Entitled: "Scratchpad Memory Management in a Computing System", San Jose, CA USA.
Yunlong Xu et al: "Lock-based Synchronization for GPU Architectures", CF' 16 Proceedings of the ACM International Conference on Computing Frontiers, ACM, 2 Penn Plaza, Suite 701 New York NY 10121-0701 USA, May 16, 2016, pp. 205-213, XP058259517, DOI: 10.1145/2903150.2903155, ISBN: 978-1-4503-4128-8 p. 205-p. 207.

* cited by examiner

| Array Index 302 | Pending Requests 304 | Lock Status 306 |
|---|---|---|
| | ▫ ▫ ▫ ••• | ▫ ▫ ▫ ••• |
| | | |
| | | |
| | • • • | • • • |

FIG. 3

| Array Index 302 | Counter 308 | Lock Status 306 |
|---|---|---|
| | | ▫ ▫ ▫ ••• |
| | | |
| | | |
| | • • • | • • • |

LOCK CIRCUIT FOR COMPETING KERNELS IN A HARDWARE ACCELERATOR

TECHNICAL FIELD

Examples of the present disclosure generally relate to hardware acceleration in computing systems and, in particular, to a lock circuit for competing kernels in a hardware accelerator.

BACKGROUND

Hardware acceleration involves the use of hardware to perform some functions more efficiently than software executing on a general-purpose CPU. A hardware accelerator is special-purpose hardware designed to implement hardware acceleration for some application. Example applications include neural networks, video encoding, decoding, transcoding, etc., network data processing, and the Ike. Software executing on the computing system interacts with the hardware accelerator through various drivers and libraries. One type of hardware accelerator includes a programmable device and associated circuitry. For example, the programmable device can be a field programmable gate array (FPGA) or a system-on-chip (SOC) that includes FPGA programmable logic among other subsystems, such as a processing system, data processing engine (DPE) array, network-on-chip (NOC), and the Ike.

In multiprocessing systems, thread synchronization can be achieved by mutex lock to avoid race conditions. Use of mutexes is common in software environments, where mutual exclusion of shared data is achieved via atomic operations. Protocols such as Peripheral Component Interface Express (PCIe) and Cache Coherent Interconnect for Accelerators (CCIX) also provide support for atomic operations, which enables hardware acceleration kernels to obtain locks and compete with software threads. For systems that have multiple acceleration kernels operating in parallel, lock requests to the host computer system by the acceleration kernels can lead to unnecessary peripheral bus utilization and increased contention handling by the host computer. There is a need for a more efficient technique for handling access to shared data by multiple acceleration kernels in a hardware acceleration system.

SUMMARY

Techniques for providing a lock circuit for competing kernels in a hardware accelerator are described. In an example, a hardware accelerator in a computing system includes: a bus interface coupled to a peripheral bus of the computing system; a lock circuit coupled to the bus interface; and a plurality of kernel circuits coupled to the lock circuit and the bus interface; wherein the plurality of kernel circuits provide lock requests to the lock circuit, the lock requests for data stored in system memory of the computing system; wherein the lock circuit is configured to process the lock requests from the plurality of kernel circuits and to issue atomic transactions over the peripheral bus through the bus interface based on the lock requests.

In another example, a computing system includes a system memory; a processor coupled to the system memory; a peripheral bus coupled to the system memory; and a hardware accelerator coupled to the peripheral bus. The hardware accelerator includes a bus interface coupled to the peripheral bus; a lock circuit coupled to the bus interface; and a plurality of kernel circuits coupled to the lock circuit and the bus interface; wherein the plurality of kernel circuits provide lock requests to the lock circuit, the lock requests for data stored in the system memory; wherein the lock circuit is configured to process the lock requests from the plurality of kernel circuits and to issue atomic transactions over the peripheral bus through the bus interface based on the lock requests.

In another example, a method of managing locks to data stored in memory among a plurality of kernels executing in a hardware accelerator of a computing system includes: receiving, at a lock circuit in the hardware accelerator, a lock request from a kernel of the plurality of kernels; determining whether a lock is held by another kernel of the plurality of kernels; indicating a pending request for the kernel in response to the lock being held by another kernel; and issuing, from the lock circuit, an atomic request for the lock over a bus interface of the computing system to obtain the lock in response to the lock not being held by another kernel.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for providing a lock circuit for competing kernels in a hardware accelerator are described. The techniques provide an efficient way of handling atomic operations initiated by multiple hardware acceleration kernels. The lock circuit provides a central contention handling circuit in the integrated circuit (IC) having the hardware acceleration kernels. The lock circuit is responsible for initiating atomic requests over a bus interface to a host computer system having the hardware accelerator having the shared data structure. This prevents the need for the kernel circuits to issue atomic requests directly through the bus interface. As such, the techniques reduce the frequency of atomic transactions over the bus interface thereby reducing contention at the host. The techniques also benefit performance by allowing different acceleration kernels to execute in parallel when multiple kernels can be granted a lock (based on use-case). These and other aspects are described below with respect to the drawings.

Figure 1A:
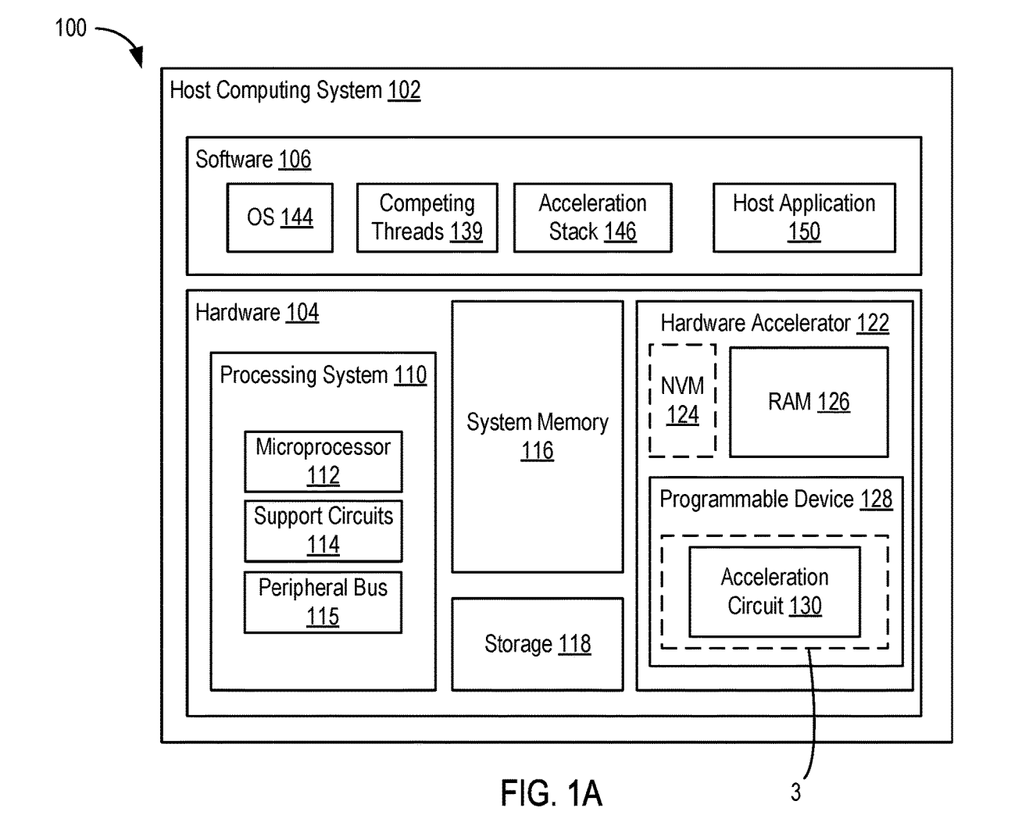
FIG. 1A is a block diagram depicting a hardware acceleration system according to an example.

FIG. 1A is a block diagram depicting a hardware acceleration system 100 according to an example. The hardware acceleration system 100 includes a host computing system 102. The host computing system 102 includes a hardware platform ("hardware 104") and a software platform ("software 106") executing on the hardware 104. The hardware 104 includes a processing system 110, system memory 116, storage devices ("storage 118"), and a hardware accelerator 122. The software 106 includes an operating system (OS) 144, an acceleration stack 146, a host application 150, and competing threads 139.

The processing system 110 includes a microprocessor 112, support circuits 114, and a peripheral bus 115. The microprocessor 112 can be any type of general-purpose central processing unit (CPU), such as an x86-based processor, ARM®-based processor, or the like. The microprocessor 112 can include one or more cores and associated circuitry (e.g., cache memories, memory management units (MMUs), interrupt controllers, etc.). The microprocessor 112 is configured to execute program code that perform one or more operations described herein and which can be stored in the system memory 116 and/or the storage 118. The support circuits 114 include various devices that cooperate with the microprocessor 112 to manage data flow between the microprocessor 112, the system memory 116, the storage 118, the hardware accelerator 122, or any other peripheral device. For example, the support circuits 114 can include a chipset (e.g., a north bridge, south bridge, platform host controller, etc.), voltage regulators, firmware (e.g., a basic input-output system (BIOS)), and the like. The support circuits 114 manage data flow between the microprocessor 112 and the peripheral bus 115, to which various peripherals, such as the hardware accelerator 122, are connected. In some examples, the microprocessor 112 can be a System-in-Package (SiP), System-on-Chip (SOC), or the like, which absorbs all or a substantial portion of the functionality of the chipset (e.g., north bridge, south bridge, etc.). The peripheral bus 115 can implement an expansion bus standard, such as Peripheral Component Interconnect Express (PCIe) or the like.

The system memory 116 is a device allowing information, such as executable instructions and data, to be stored and retrieved. The system memory 116 can include, for example, one or more random access memory (RAM) modules, such as double-data rate (DDR) dynamic RAM (DRAM). The storage 118 includes local storage devices (e.g., one or more hard disks, flash memory modules, solid state disks, and optical disks) and/or a storage interface that enables the computing system 102 to communicate with one or more network data storage systems. The hardware 104 can include various other conventional devices and peripherals of a computing system, such as graphics cards, universal serial bus (USB) interfaces, and the like.

In an example, the hardware accelerator 122 includes a programmable device 128 and RAM 126. The hardware accelerator 122 can optionally include a non-volatile memory (NVM) 124. The programmable device 128 can be a field programmable gate array (FPGA) or an SOC having FPGA programmable logic along with other embedded subsystems. The NVM 124 can include any type of non-volatile memory, such as flash memory or the like. The RAM 126 can include DDR DRAM or the like. The RAM 126 can be organized into discrete RAM banks 127, as described further below. The programmable device 128 is coupled to the NVM 124 and the RAM 126. The programmable device 128 is also coupled to the peripheral bus 115 of the processing system 110.

The OS 144 can be any commodity operating system known in the art, such as such as Linux®, Microsoft Windows®, Mac OS®, or the like. The acceleration stack 146 includes drivers and libraries that provide application programming interfaces (APIs) to the hardware accelerator 122 for command and control thereof.

Figure 1B:
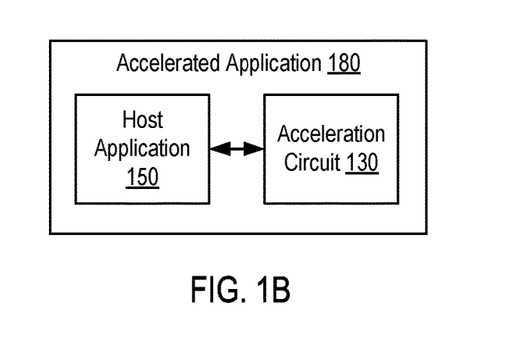
FIG. 1B is a block diagram depicting an accelerated application according to an example.

FIG. 1B is a block diagram depicting an accelerated application 180 according to an example. The accelerated application 180 includes the host application 150 and an acceleration circuit 130. The acceleration circuit 130 is programmed in programmable logic (PL) 3 of the programmable device 128 on the hardware accelerator 122. The host application 150 includes software executing on the microprocessor 112 that invokes the acceleration circuit 130 using API calls to the acceleration stack 146 to perform some work. The host application 150 can include neural network, video processing, network processing, or the like type applications that offload some functions to the hardware accelerator 122.

Figure 1C:
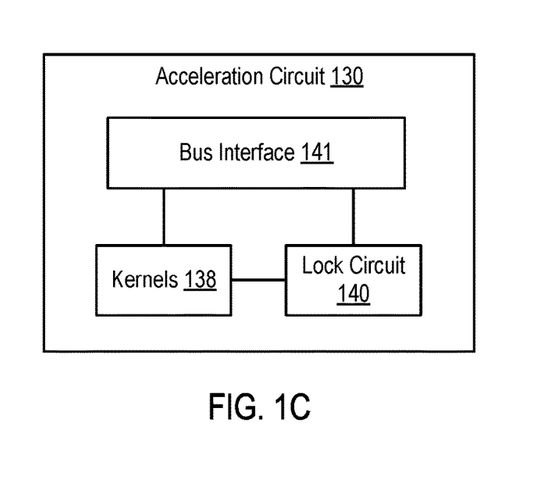
FIG. 1C is a block diagram depicting an acceleration circuit according to an example.

FIG. 1C is a block diagram depicting the acceleration circuit 130 according to an example. The acceleration circuit 130 includes a bus interface 141, kernels 138, and a lock circuit 140. In particular, the host application 150 calls APIs of the acceleration stack 146 to program kernel circuits ("kernel(s) 138") in the PL 3 of the programmable device 128. The kernel(s) 138 include compute units for processing data. Once the kernel(s) 138 have been programmed, the host application 150 can access the kernel(s) 138 through the bus interface 141. The kernels 138 can process data stored in the system memory 116 and/or the RAM 126. In particular, the kernels 138 access the system memory 116 through the bus interface 141 and the RAM 126 through memory interfaces of the programmable device 128. The kernels 138 can access data in the system memory 116 in competition with the competing threads 139. Since the system memory 116 is shared between the competing threads 139 and the kernels 138, the acceleration circuit 130 includes a lock circuit 140. The kernels 138 are coupled to the lock circuit 140 and use the lock circuit 140 to issue atomic transactions over the bus interface 141 for acquiring locks to data in the system memory 116. The lock circuit 140 provides a single source of atomic transactions over the bus interface 141, rather than having all the individual kernels 138 issue atomic transactions over the bus interface 141. Operation of the lock circuit 140 is discussed further below.

In the example, the processing system 110 is shown separate from the hardware accelerator 122. In other examples discussed further below, the processing system 110 and the hardware accelerator 122 can be implemented within the same programmable device (e.g., a programmable device with an embedded processing system). In such case, the processing system 110 can utilize alternative interconnects with the PL 3 for communicating with the acceleration circuit 130, examples of which are described below. Further, in the examples discussed herein, the acceleration circuit 130 is implemented in a programmable device 128. In other examples, the programmable device 128 can be replaced by any integrated circuit (IC), including an application specific integrated circuit (ASIC) in which the acceleration circuit 130 comprises hardened circuitry formed therein. Thus, the lock circuit 140 and mutual exclusion scheme discussed herein applies to acceleration circuits in both programmable devices and ASICs.

Figure 2:
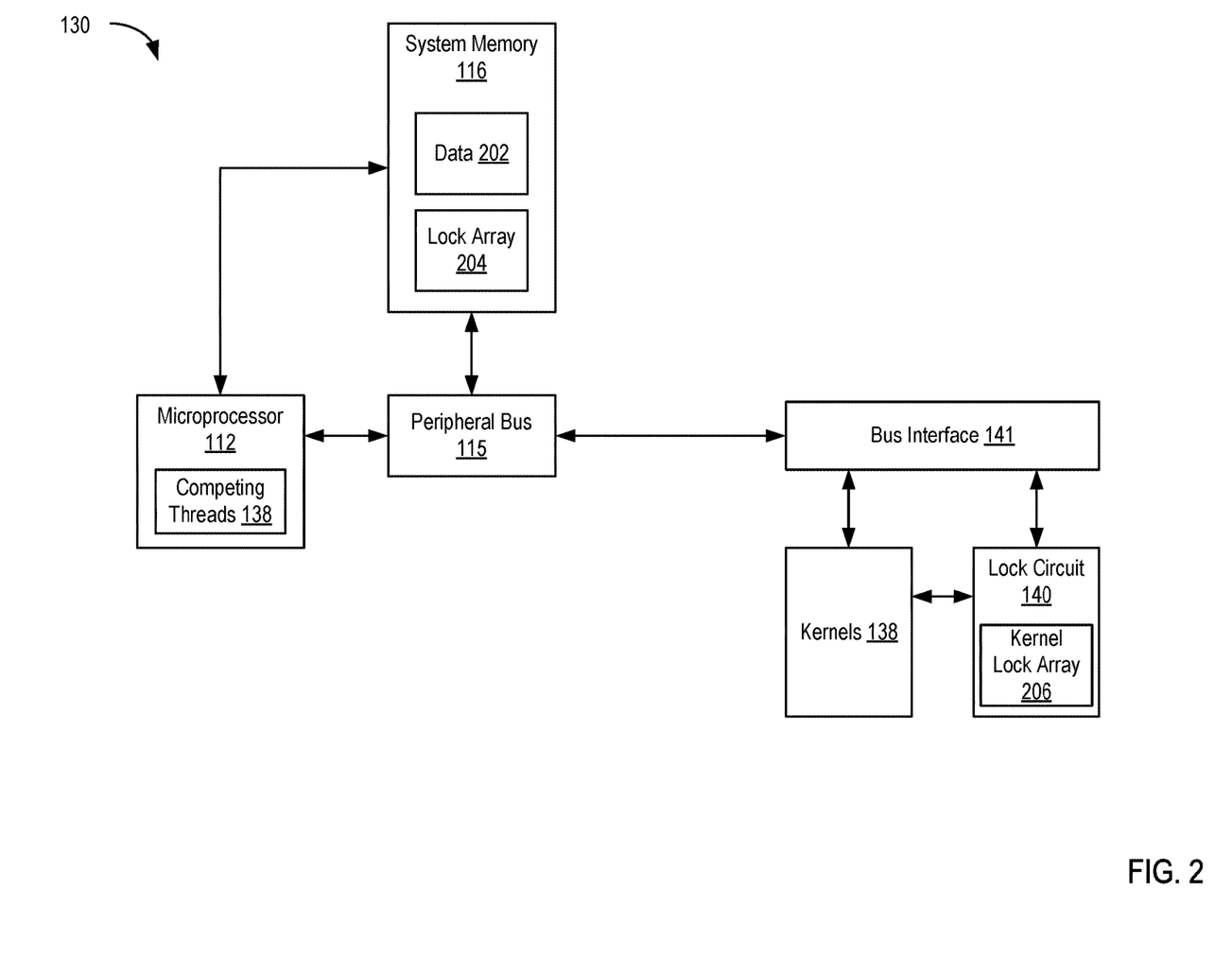
FIG. 2 is a block diagram depicting a logical view of the computing system of FIG. 1A.

FIG. 2 is a block diagram depicting a logical view of the computing system 102 according to an example. As shown in FIG. 2, the kernels 138 access data 202 in the system memory 116 through the bus interface 141 and the peripheral bus 115. The competing threads 139 execute on the microprocessor 112 and also access the data 202 in the system memory 116. The competing threads 139 use a lock array 204 to control access to the data 202. The lock array 204 is indexed by identifiers for certain portions of the data 202. Before accessing a portion of the data 202, a competing thread 139 checks the lock array 204 using an identifier for the data portion to see if a lock has been set by another thread. If not, the competing thread 139 sets the lock and accesses the data exclusive of the other competing threads 139. The competing threads 139 set and check locks in the lock array 204 using atomic instructions of the microprocessor 112.

The lock circuit 140 maintains a kernel lock array 206. The lock circuit 140 is the central contention handling block for all the kernels 138. Assume N kernels 138 where N is an integer greater than one. The lock circuit 140 maintains the kernel lock array 206 indexed by identifiers for the data 202. In an example, the identifiers are all or a portion of hash values generated from keys to the data 202. Each element in the kernel lock array 206 is (2*N) bits wide where the lower N bits indicate lock status and the upper N bits indicate pending requests. All of the kernels 138 direct their request for locks to the lock circuit 140, rather than directly over the peripheral bus 115 through the bus interface 141. The lock circuit 140 is the only circuit that requests locks through the bus interface 141.

Figure 3:
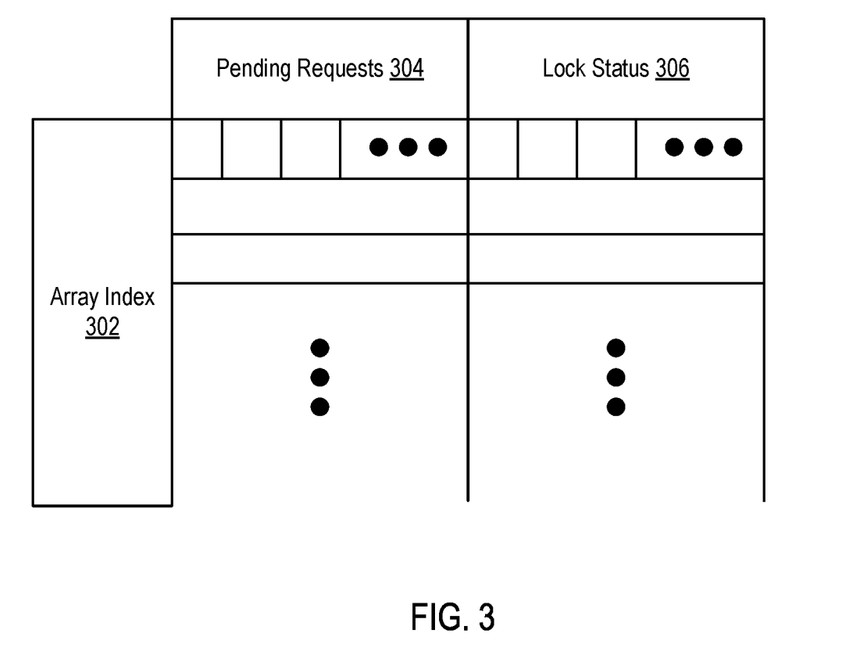
FIG. 3 is a block diagram depicting an example kernel lock array.

FIG. 3 is a block diagram depicting an example of the kernel lock array 206. In the example, the kernel lock array 206 includes an array index 302. The array index 302 can be any set of identifiers for the data 202, such as all or a portion of hash values derived from keys to the data (e.g., memory addresses or some other keys associated with the data 202). Each entry in the kernel lock array 206 includes pending requests 304 and lock status 306. The pending requests 304 include N bits, one for each of the kernels 138. The lock status 306 includes N bits, one for each of the kernels 138.

Figure 5:
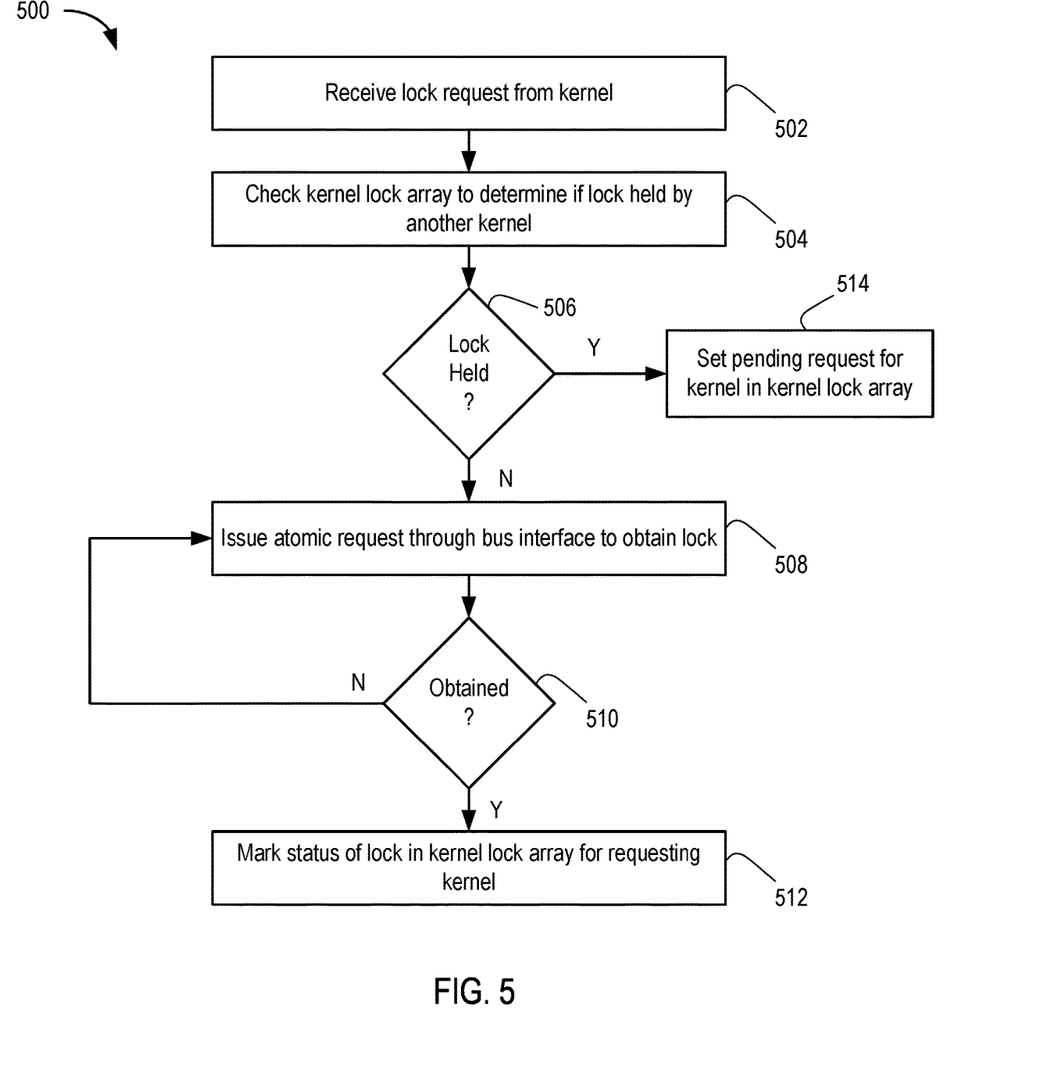
FIG. 5 is a flow diagram depicting a method of managing lock requests according to an example.

FIG. 5 is a flow diagram depicting a method 500 of managing lock requests according to an example. Referring to FIGS. 2 and 5, the lock circuit 140 operates as follows. On receiving a lock request from a kernel 138 (step 502), which includes the kernel ID and an index value, the lock circuit 140 checks the kernel lock array 206 indexed by the index value to determine if a lock is held by some other kernel 138 (step 504). If the lock is not held (step 506), the lock circuit 140 issues an atomic request through the bus interface 141 to the peripheral bus 115 to check the lock array 204 (step 508). If the requested data portion is not locked (510), the peripheral bus 115 returns the lock to the lock circuit 140. The lock circuit 140 then marks the status of the lock in the kernel lock array 206 as '1' in the bit position corresponding to the kernel ID (512). If the requested data portion cannot be locked (510), the lock circuit 140 can issue the atomic request again after some waiting period. If the status of the lock is non-zero (step 506), which indicates a lock is held by another kernel 138, the lock circuit 140 instead sets a bit for the kernel ID in the pending requests field (step 514). The kernel 138 must then wait to access the requested data portion.

Figure 6:
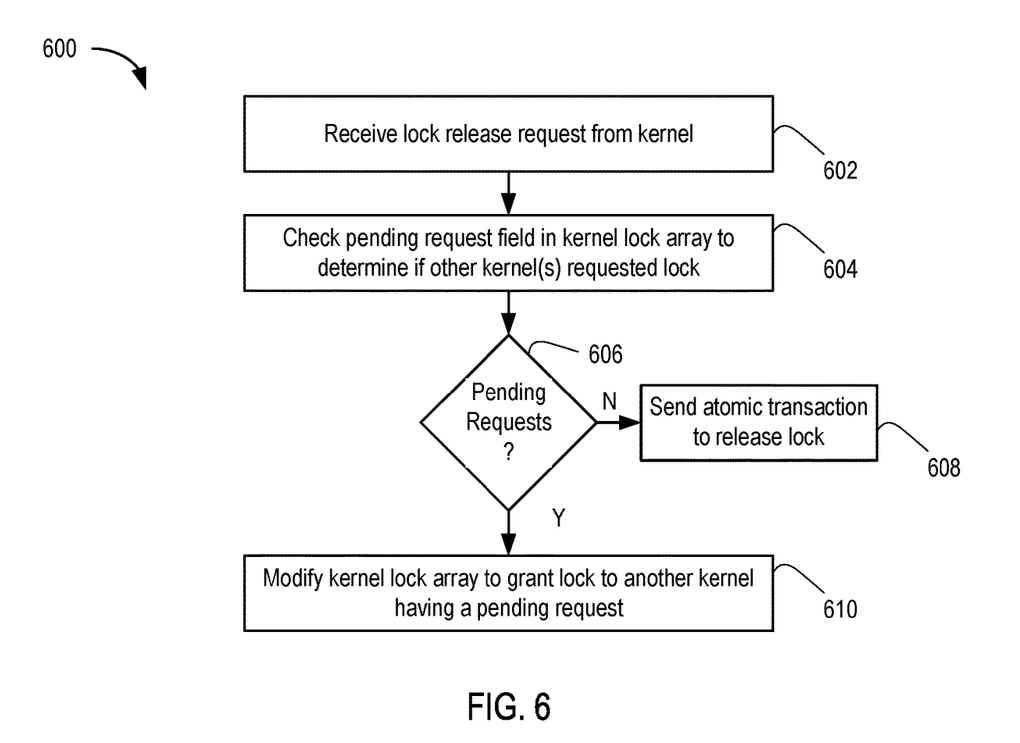
FIG. 6 is a flow diagram depicting a method of managing lock releases according to an example.

FIG. 6 is a flow diagram depicting a method 600 of managing lock releases according to an example. Referring to FIGS. 2 and 6, on receiving a lock release request from a kernel 138 (step 602), which includes the kernel ID and the index, the lock circuit 140 checks the pending request field of that lock index (604). If the pending request field is zero (step 606), then the lock circuit 140 releases the lock by sending an atomic transaction over the peripheral bus through the bus interface 141 (step 608). If the pending request field is non-zero (step 606), the lock circuit 140 instead grants the lock to another kernel 138 that had previously requested a lock and did not receive the lock, but instead had a pending request set (step 610).

The lock circuit 140 prevents unnecessary atomic traffic over the peripheral bus 115 and handles acceleration circuit related contention locally. A kernel 138 awaiting grant of a lock need not send repeated atomic transactions over the peripheral bus 115.

Figure 4:
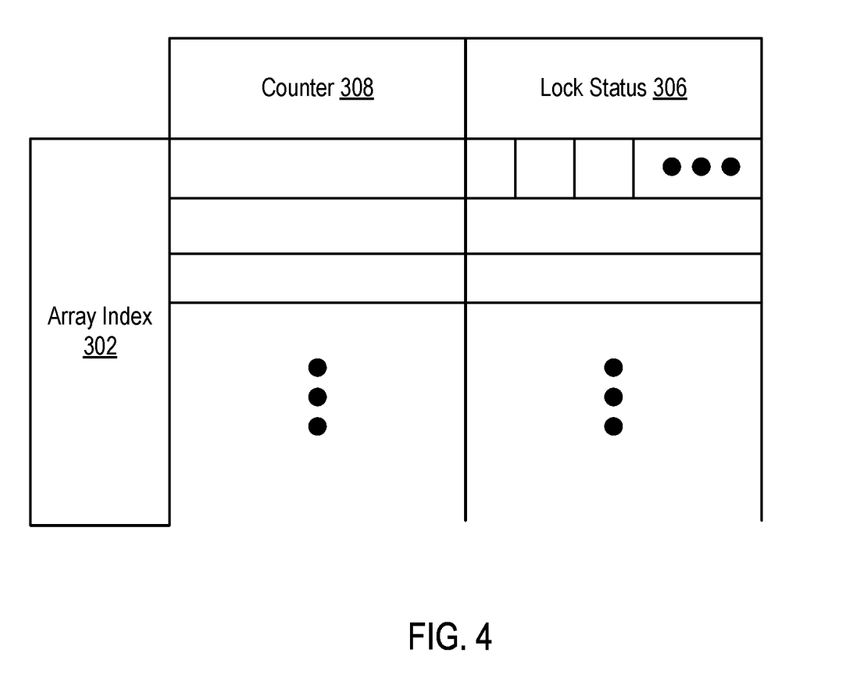
FIG. 4 is a block diagram depicting another example kernel lock array.

In cases where the kernels 138 need a lock to only access data (not modify), multiple kernels 138 can be granted locks concurrently by the lock circuit 140. The pending request field can be converted to a counter to keep track of how many kernels are currently granted a lock. FIG. 4 is a block diagram depicting an example of the kernel lock array 206 having the counter field 308 rather than the pending requests field 304. The counter field 308 includes one value for each entry indicating the number of kernels that have been granted locks. The lock circuit 140 decrements the counter field 308 on lock release requests from the kernels 138. When the counter field 308 reaches zero, the lock circuit 140 sends an atomic request over the peripheral bus 115 to release the lock to the data. This scheme is useful in applications such as memcached, where a lock is basically taken to prevent a host application from modifying data as in SET operations when GET operations are offloaded to multiple kernels 138. This has the benefit of enabling parallel processing that is not possible with software alone.

Based on application requirements, if a write (e.g., increment of some field in a data structure) is also required when a kernel 138 takes a lock, that increment can be done via an atomic store-add operation and multiple user kernels 138 can still operate in parallel providing better overall performance. If use-case analytics imply that holding a lock for a certain period of time causes starvation of the competing threads 139, then a threshold counter can be implemented in lock circuit 140 such that a lock is not held for more than a set number of kernels 138 once a lock is taken by a first kernel 138.

Figure 7A:
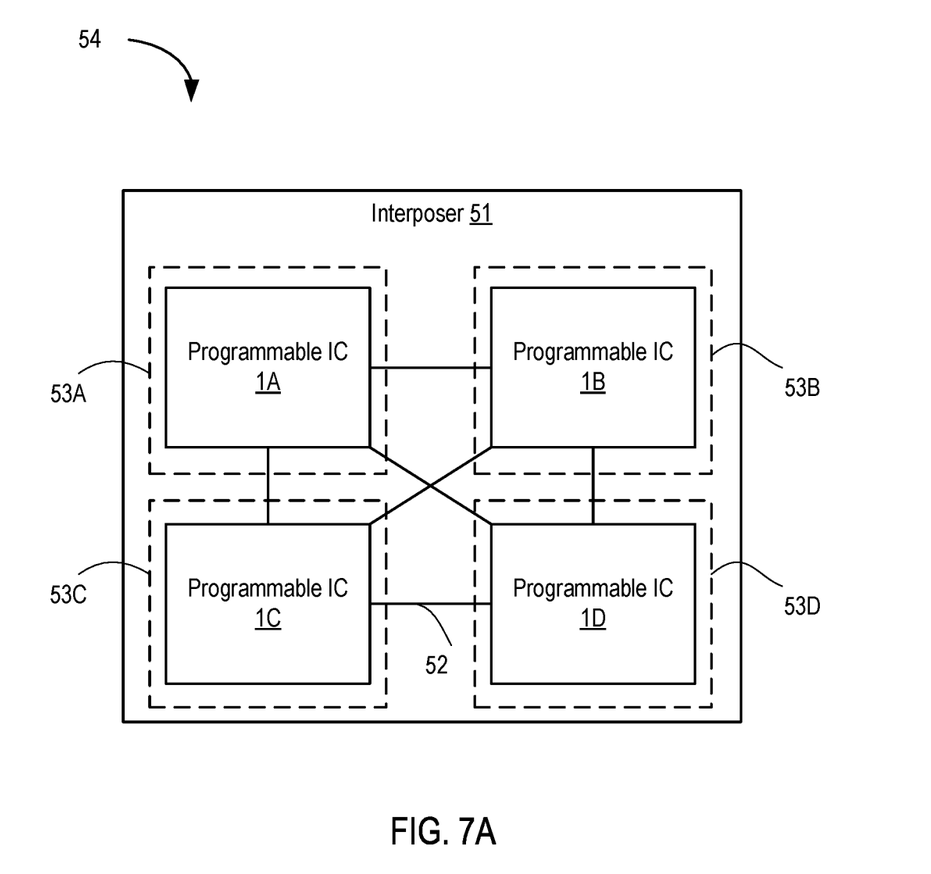
FIG. 7A is a block diagram depicting a multi-integrated circuit (IC) programmable device according to an example.

FIG. 7A is a block diagram depicting a programmable device 54 according to an example. The programmable device 54 can be used to implement the programmable device 128 in the hardware accelerator 122. The programmable device 54 includes a plurality of programmable integrated circuits (ICs) 1, e.g., programmable ICs 1A, 1B, 1C, and 1D. In an example, each programmable IC 1 is an IC die disposed on an interposer 51. Each programmable IC 1 comprises a super logic region (SLR) 53 of the programmable device 54, e.g., SLRs 53A, 53B, 53C, and 53D. The programmable ICs 1 are interconnected through conductors on the interposer 51 (referred to as super long lines (SLLs) 52).

Figure 7B:
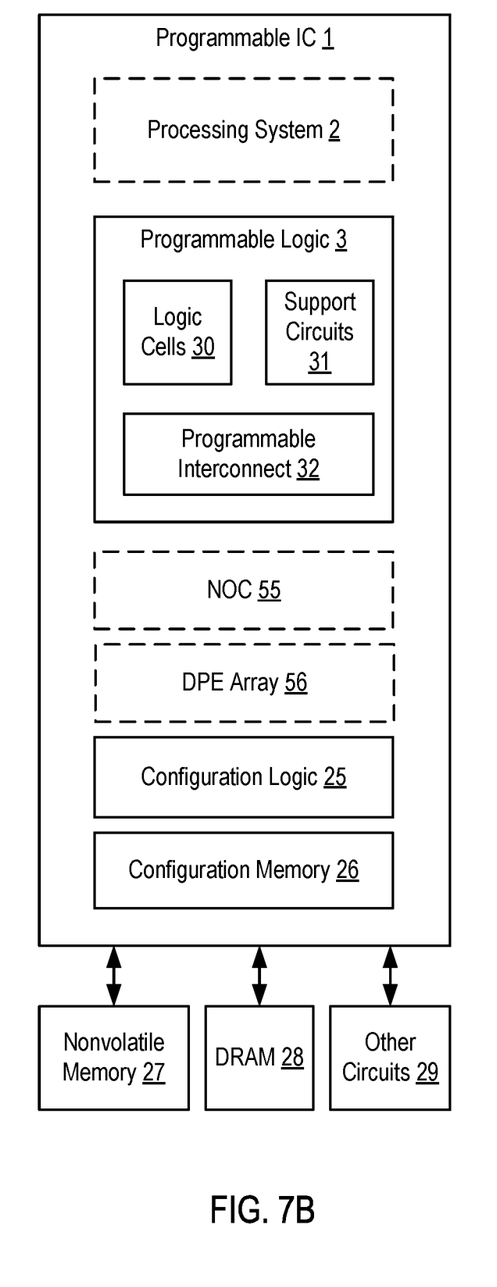
FIG. 7B is a block diagram depicting a programmable IC according to an example.

FIG. 7B is a block diagram depicting a programmable IC 1 according to an example. The programmable IC 1 can be used to implement the programmable device 128 or one of the programmable ICs 1A-1D in the programmable device 54. The programmable IC 1 includes programmable logic 3 (also referred to as a programmable fabric), configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, 10 circuits, and the like. In some examples, the programmable IC 1 includes a network-on-chip (NOC) 55 and data processing engine (DPE) array 56. The NOC 55 is configured to provide for communication between subsystems of the programmable IC 1, such as between the PS 2, the PL 3, and the DPE array 56. The DPE array 56 can include an array of DPE's configured to perform data processing, such as an array of vector processors.

Figure 7C:
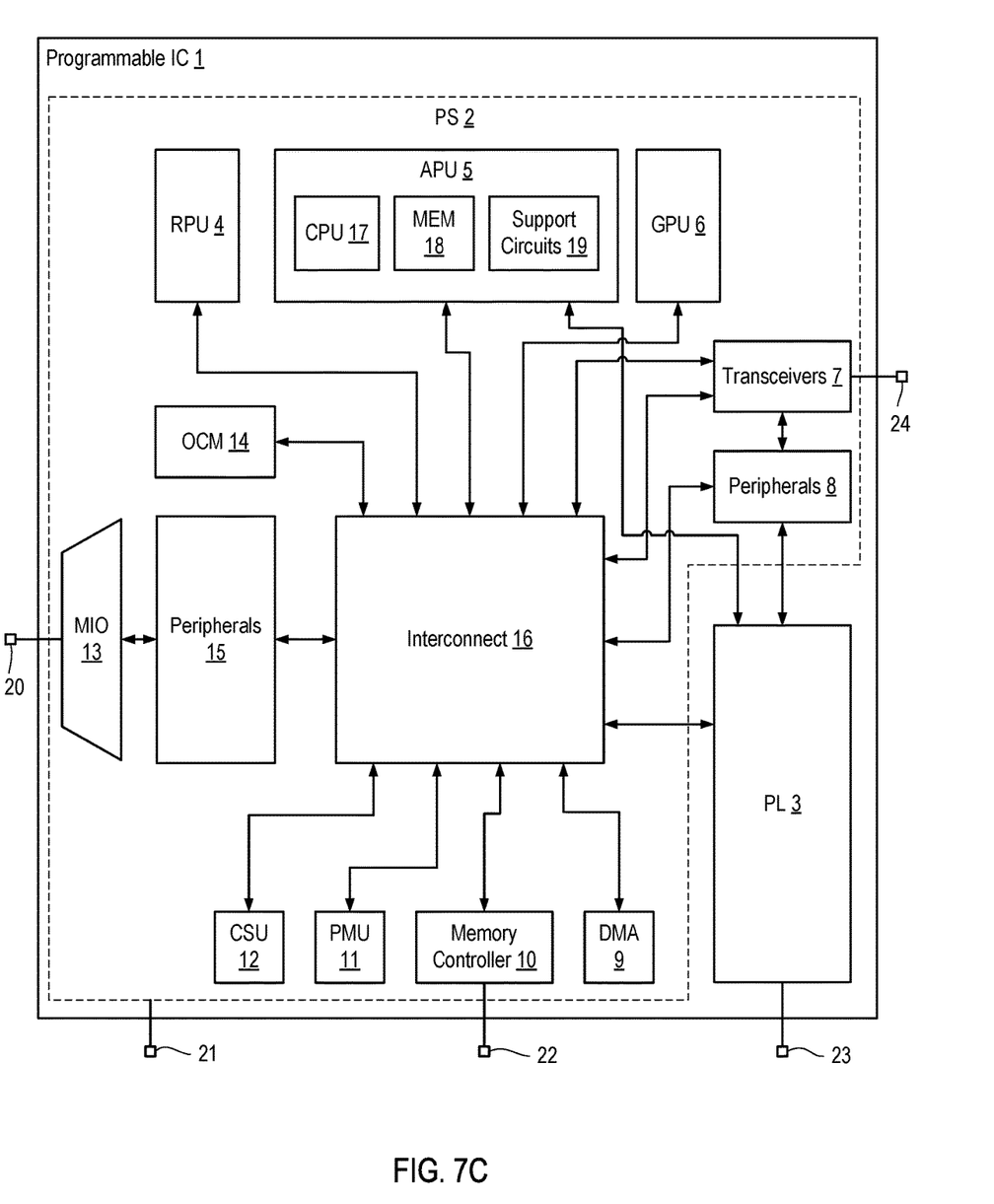
FIG. 7C is a block diagram depicting a System-on-Chip (SOC) implementation of a programmable IC according to an example.

FIG. 7C is a block diagram depicting an SOC implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 122, and the like. The processing system 2 also includes various support circuits, such as on-chip memory (OCM) 14, transceivers 7, peripherals 8, interconnect 16, DMA circuit 9, memory controller 10, peripherals 15, and multiplexed 10 (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19.

In the example of FIG. 3C, the programmable IC 1 can be used in the hardware accelerator 122 and can function as described above. The acceleration circuit 130 can be programmed in the PL 3 and function as described above. In another example, the functionality of the hardware 104 described above can be implemented using the PS 2, rather than through hardware of a computing system. In such case, the software 106 executes on the PS 2 and functions as described above.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 15 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose 10 (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, multi-gigabit transceivers (MGTs), and the like.

Figure 7D:
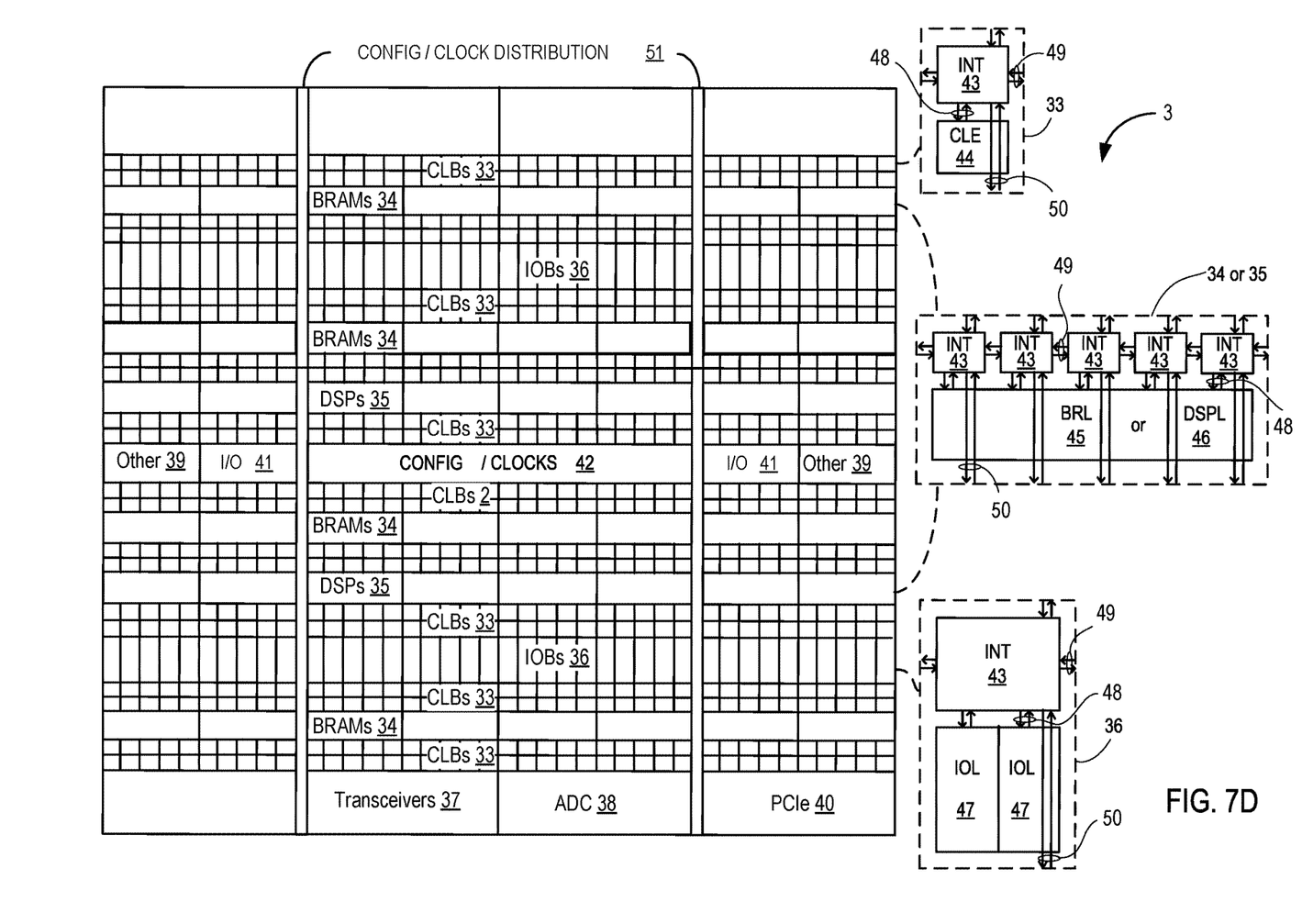
FIG. 7D illustrates a field programmable gate array (FPGA) implementation of a programmable IC according to an example.

FIG. 7D illustrates a field programmable gate array (FPGA) implementation of the programmable IC 1 that includes the PL 3. The PL 3 shown in FIG. 7D can be used in any example of the programmable devices described herein. The PL 3 includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The PL 3 can also include PCIe interfaces 40, analog-to-digital converters (ADC) 38, and the like.

In some PLs, each programmable tile can include at least one programmable interconnect element ("INT") 43 having connections to input and output terminals 48 of a programmable logic element within the same tile, as shown by examples included at the top of FIG. 7D. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated PL.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 3D) is used for configuration, clock, and other control logic. Vertical columns 51 extending from this horizontal area or column are used to distribute the clocks and configuration signals across the breadth of the PL.

Some PLs utilizing the architecture illustrated in FIG. 5D include additional logic blocks that disrupt the regular columnar structure making up a large part of the PL. The additional logic blocks can be programmable blocks and/or dedicated logic. Note that FIG. 7D is intended to illustrate only an exemplary PL architecture. For example, the numbers of logic blocks in a row, the relative width of the rows, the number and order of rows, the types of logic blocks included in the rows, the relative sizes of the logic blocks, and the interconnect/logic implementations included at the top of FIG. 7D are purely exemplary. For example, in an actual PL more than one adjacent row of CLBs is typically included wherever the CLBs appear, to facilitate the efficient implementation of user logic, but the number of adjacent CLB rows varies with the overall size of the PL.

While the foregoing is directed to specific examples, other and further examples may be devised without departing from the basic scope thereof, and the scope thereof is determined by the claims that follow.

What is claimed is:

1. A hardware accelerator in a computing system, the computing system including a processor and a random access memory (RAM) each coupled to a peripheral bus, the processor executing competing threads that use a lock array in the RAM to obtain exclusive access to data in the RAM, the hardware accelerator comprising:
   an integrated circuit having a bus interface, a lock circuit, and a plurality of kernel circuits;
   the bus interface coupled to the peripheral bus of the computing system;
   the lock circuit coupled to the bus interface; and
   the plurality of kernel circuits coupled to the lock circuit and the bus interface;
   wherein the plurality of kernel circuits is configured to provide lock requests to the lock circuit, the lock requests for the data stored in the RAM of the computing system;
   wherein the lock circuit is configured to process the lock requests from the plurality of kernel circuits and to issue atomic transactions over the peripheral bus through the bus interface based on the lock requests, the lock circuit configured to issue the atomic transactions in competition with the competing threads to check the lock array in the RAM for exclusive access to the data.

2. The hardware accelerator of claim 1, wherein the lock circuit is configured to maintain a kernel lock array, and wherein the kernel lock array includes a plurality of elements each having a pending request field and a lock status field.

3. The hardware accelerator of claim 2, wherein the pending request field includes a plurality of entries corresponding to the plurality of kernel circuits, and wherein the lock status field includes a plurality of entries corresponding to the plurality of kernel circuits.

4. The hardware accelerator of claim 3, wherein the lock circuit is configured to, for each of the lock requests, check the lock status field of a corresponding element in the kernel lock array, set a lock in the lock status field of the corresponding element if available, and indicating a pending lock request in the pending request field if a lock is not available.

5. The hardware accelerator of claim 1, wherein the lock circuit is configured to maintain a kernel lock array, and wherein the kernel lock array includes a plurality of elements each having a counter field and a lock status field.

6. The hardware accelerator of claim 5, wherein the counter field includes a value, and wherein the lock status field includes a plurality of entries corresponding to the plurality of kernel circuits.

7. The hardware accelerator of claim 6, wherein the lock circuit is configured to, for each of the lock requests, check the lock status field of a corresponding element in the kernel lock array, set a lock in the lock status field of the corresponding element, and increment the value in the counter field of the corresponding element.

8. A computing system, comprising:
   a random access memory (RAM), the RAM storing a lock array and data;
   a processor coupled to the RAM, the processor having competing threads executing therein that use the lock array to obtain exclusive access to the data;
   a peripheral bus coupled to the processor and the RAM; and
   a hardware accelerator coupled to the peripheral bus, the hardware accelerator comprising an integrated circuit having a bus interface, a lock circuit, and a plurality of kernel circuits;
   the bus interface coupled to the peripheral bus;
   the lock circuit coupled to the bus interface; and
   the plurality of kernel circuits coupled to the lock circuit and the bus interface;
   wherein the plurality of kernel circuits provide lock requests to the lock circuit, the lock requests for the data stored in the RAM;
   wherein the lock circuit is configured to process the lock requests from the plurality of kernel circuits and to issue atomic transactions over the peripheral bus through the bus interface based on the lock requests, the lock circuit configured to issue the atomic transactions in competition with the competing threads to check the lock array in the RAM for exclusive access to the data.

9. The computing system of claim 8, wherein the lock circuit is configured to maintain a kernel lock array, and wherein the kernel lock array includes a plurality of elements each having a pending request field and a lock status field.

10. The computing system of claim 9, wherein the pending request field includes a plurality of entries corresponding to the plurality of kernel circuits, and wherein the lock status field includes a plurality of entries corresponding to the plurality of kernel circuits.

11. The computing system of claim 10, wherein the lock circuit is configured to, for each of the lock requests, check the lock status field of a corresponding element in the kernel lock array, set a lock in the lock status field of the corresponding element if available, and indicating a pending lock request in the pending request field if a lock is not available.

12. The computing system of claim 8, wherein the lock circuit is configured to maintain a kernel lock array, and wherein the kernel lock array includes a plurality of elements each having a counter field and a lock status field.

13. The computing system of claim 12, wherein the counter field includes a value, and wherein the lock status field includes a plurality of entries corresponding to the plurality of kernel circuits.

14. The computing system of claim 13, wherein the lock circuit is configured to, for each of the lock requests, check the lock status field of a corresponding element in the kernel lock array, set a lock in the lock status field of the corresponding element, and increment the value in the counter field of the corresponding element.

15. A method of managing locks to data stored in random access memory (RAM) among a plurality of kernels executing in a hardware accelerator of a computing system, the computing system including a processor and the RAM each coupled to a peripheral bus, the processor executing competing threads that use a lock array in the RAM to obtain exclusive access to the data, the method comprising:
receiving, at a lock circuit in the hardware accelerator, a lock request from a kernel of the plurality of kernels, the hardware accelerator comprising an integrated circuit having the lock circuit, the plurality of kernels, and a bus interface;
determining whether a lock is held by another kernel of the plurality of kernels;
indicating a pending request for the kernel in response to the lock being held by another kernel; and
issuing, from the lock circuit, an atomic request for the lock through the bus interface to a peripheral bus of the computing system to obtain the lock in response to the lock not being held by another kernel, the lock circuit issuing the atomic request in competition with the competing threads to check the lock array in the RAM for exclusive access to the data.

16. The method of claim 15, further comprising:
indicating that the kernel has the lock.

17. The method of claim 15, further comprising:
receiving a lock release request from the kernel at the lock circuit;
determining whether another kernel of the plurality of kernels has a pending lock request;
issuing, from the lock circuit, another atomic request to release the lock through the bus interface to the peripheral bus of the computing system in response to absence of a pending lock request; and
granting, by the lock circuit, the lock to another kernel of the plurality of kernels in response to presence of a pending lock request.

18. The method of claim 15, wherein the lock circuit is configured to maintain a kernel lock array, and wherein the kernel lock array includes a plurality of elements each having a pending request field and a lock status field.

19. The method of claim 18, wherein the pending request field includes a plurality of entries corresponding to the plurality of kernel circuits, and wherein the lock status field includes a plurality of entries corresponding to the plurality of kernel circuits.

20. The method of claim 15, wherein the lock circuit is configured to maintain a kernel lock array, and wherein the kernel lock array includes a plurality of elements each having a counter field and a lock status field.

* * * * *